United States Patent
Van Dyke

(10) Patent No.: US 9,690,715 B2
(45) Date of Patent: Jun. 27, 2017

(54) SELECTING HASH VALUES BASED ON MATRIX RANK

(71) Applicant: NVIDIA CORPORATION, Santa Clara, CA (US)

(72) Inventor: James M. Van Dyke, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 200 days.

(21) Appl. No.: 14/475,951

(22) Filed: Sep. 3, 2014

(65) Prior Publication Data

US 2016/0062910 A1 Mar. 3, 2016

(51) Int. Cl.
*G06F 12/08* (2016.01)
*G06F 12/1018* (2016.01)
(Continued)

(52) U.S. Cl.
CPC ...... *G06F 12/1018* (2013.01); *G06F 12/0207* (2013.01); *G06F 12/0875* (2013.01); *G06F 12/0864* (2013.01); *G06F 12/1408* (2013.01); *G06F 2212/1016* (2013.01); *G06F 2212/452* (2013.01); *G06F 2212/455* (2013.01); *G06F 2212/601* (2013.01); *G06F 2212/651* (2013.01)

(58) Field of Classification Search
CPC ............ G06F 12/0875; G06F 17/3033; G06F 17/30067; G06F 17/30625; G06F 17/30628; G06F 17/30631; G06F 2212/651; G06F 2212/452
See application file for complete search history.

(56) References Cited

U.S. PATENT DOCUMENTS

| | | | | |
|---|---|---|---|---|
| 4,433,389 A | * | 2/1984 | York ................ | G06F 17/30949 707/E17.036 |
| 4,636,946 A | * | 1/1987 | Hartung ............. | G06F 12/0804 711/113 |

(Continued)

OTHER PUBLICATIONS

Jack Shirazi. "Optimizing Hash Functions for Perfect Map," Jan. 25, 2001, "http://archive.oreilly.com/pub/a/onjava/2001/01/25/hash_functions.html". 5 pages.*

*Primary Examiner* — Pierre-Michel Bataille
(74) *Attorney, Agent, or Firm* — Artegis Law Group, LLP

(57) ABSTRACT

One embodiment of the present invention includes a hash selector that facilitates performing effective hashing operations. In operation, the hash selector creates a transformation matrix that reflects specific optimization criteria. For each hash value, the hash selector generates a potential hash value and then computes the rank of a submatrix included in the transformation matrix. Based on this rank in conjunction with the optimization criteria, the hash selector either re-generates the potential hash value or accepts the potential hash value. Advantageously, the optimization criteria may be tailored to create desired correlations between input patterns and the results of performing hashing operations based on the transformation matrix. Notably, the hash selector may be configured to efficiently and reliably incrementally generate a transformation matrix that, when applied to certain strides of memory addresses, produces a more uniform distribution of accesses across caches lines than previous approaches to memory addressing.

21 Claims, 6 Drawing Sheets

(51) Int. Cl.
*G06F 12/0875* (2016.01)
*G06F 12/02* (2006.01)
G06F 12/0864 (2016.01)
G06F 12/14 (2006.01)

(56) References Cited

U.S. PATENT DOCUMENTS

| | | | | |
|---|---|---|---|---|
| 5,111,389 A * | 5/1992 | McAuliffe | ......... | G06F 12/0607 |
| | | | | 711/200 |
| 5,133,061 A * | 7/1992 | Melton | ............... | G06F 12/0864 |
| | | | | 711/128 |
| 5,276,826 A * | 1/1994 | Rau | .................... | G06F 12/0607 |
| | | | | 710/60 |
| 7,120,856 B2 * | 10/2006 | Zhang | ................ | H03M 13/1137 |
| | | | | 714/801 |
| 7,945,760 B1 * | 5/2011 | Barry | ................. | G06F 9/30032 |
| | | | | 711/202 |
| 2007/0094477 A1 * | 4/2007 | Espasa | ................ | G06F 12/0844 |
| | | | | 711/217 |
| 2010/0077176 A1 * | 3/2010 | Pearlstein | ............... | G06F 7/785 |
| | | | | 712/22 |
| 2011/0153861 A1 * | 6/2011 | Chauhan | ................. | H04L 69/04 |
| | | | | 709/232 |
| 2012/0137075 A1 * | 5/2012 | Vorbach | ................. | G06F 9/526 |
| | | | | 711/122 |
| 2013/0138862 A1 * | 5/2013 | Motwani | ........... | G06F 17/30194 |
| | | | | 711/5 |

\* cited by examiner

Transform Submatrix 410(0)

| 0 | 0 | F(0) |
|---|---|------|
| 1 | 0 | F(1) |
| 0 | 1 | F(2) |

Transform Submatrix 410(1)

| 0 | F(0) | G(0) |
|---|------|------|
| 0 | F(1) | G(1) |
| 1 | F(2) | G(2) |

Transform Submatrix 410(2)

| F(0) | G(0) | H(0) |
|------|------|------|
| F(1) | G(1) | H(1) |
| F(2) | G(2) | H(2) |

Transform Submatrix 410(3)

| G(0) | H(0) | I(0) |
|------|------|------|
| G(1) | H(1) | I(1) |
| G(2) | H(2) | I(2) |

For F: Is submatrix 410(0) non-singular?
For G: Is submatrix 410(1) non-singular?
For H: Is submatrix 410(2) non-singular?
For I: Is submatrix 410(3) non-singular?

Hash Evaluation Criteria
470

FIG. 4

SELECTING HASH VALUES BASED ON MATRIX RANK

BACKGROUND OF THE INVENTION

Field of the Invention

The present invention generally relates to computer science and, more specifically, to selecting hash vales based on matrix rank.

Description of the Related Art

A typical computer system includes a central processing unit (CPU) and one or more parallel processing units (GPUs). The CPU usually executes the overall structure of a software application and then configures the PPUs to implement tasks that are amenable to parallel processing. As part of executing the software application, the CPU and the GPU access physical memory locations included in the computer system. Such memory locations may be included in any memory accessible to the computer system, such as larger, relatively low speed system memory or smaller, relatively high speed memory caches.

To optimize the performance of the software application, the CPU and GPU are usually designed to store frequently accessed data in the memory caches. And since memory buses included in computer systems are architected to transfer data in discrete memory blocks, the memory caches are typically designed to store data in "cache lines," where each cache line stores a multiple of this memory block. Accordingly, the computer system implements one or more memory addressing techniques that map each memory address associated with a memory cache to a corresponding cache line included in the memory cache and an offset within the cache line.

In one approach to memory addressing, a sequential series of bits in each memory address maps to a cache line within the cache in a direct fashion. For instance, suppose that a particular cache were to include $2^S$ cache lines. In some computer systems, the computer system would linearly map the S upper bits or the S lower bits included in the memory address to the cache line. While this direct memory addressing approach is relative simple to implement, this approach may lead to uneven distribution of memory accesses across caches lines—"hotspotting" certain cache lines in the cache. For example, if a particular software application were to address memory at an interval that shared a common integer multiple with the size of the cache, then the corresponding memory access operations would involve only a single cache line. In general, hotspotting bottle-necks specific computer system resources and, consequently, may degrade the overall performance of the computer system.

Increasingly, to distribute memory accesses more uniformly across cache lines irrespective of access patterns of various software applications, computer systems incorporate hashing operations into the memory addressing process. In operation, the computer system generates a transform matrix that includes hash values. Subsequently, the computer system performs arithmetic operations between the transform matrix and the input address to create "swizzled" addresses used to access the appropriate data within the cache.

Typically, to select the hash values, the computer system randomly generates multiple sets of numbers—setting the hash values to the set of numbers that experimentally demonstrates the highest likelihood of reducing hotspotting. Notably, most hash values lead to limited reduction in hotspotting. Consequently, identifying a set of hash values that causes significant improvement in the overall performance of the computer system usually requires generating, performing experimental test-runs, and evaluating many sets of random numbers. This ambiguous and repetitive approach to hash selection is time consuming and does not necessarily lead to the desired performance improvement in memory addressing.

As the foregoing illustrates, what is needed in the art is a more effective approach to addressing memory caches.

SUMMARY OF THE INVENTION

One embodiment of the present invention sets forth a computer-implemented method for performing hashing operations. The method includes generating a first potential hash value; assigning a first set of entries included in a transformation matrix to the first potential hash value; computing a first rank of a first sub-matrix included in the transformation matrix, where the first sub-matrix includes the first set of entries included the transformation matrix; based on the first rank, determining that the first potential hash value does not satisfy a first optimization criterion; generating a second potential hash value; re-assigning the first set of entries included in the transformation matrix to the second potential hash value; and performing one or more hashing operations based on the transformation matrix to map a first multi-bit value to a second multi-bit value.

One advantage of the disclosed approach is that the judicious selection of hash values included in a transformation matrix enables efficient tuning of the associated memory address mapping to optimize the performance of computer systems. Notably, by selecting the hash values based on matrix rank, accesses associated with particular patterns of input addresses may be uniformly distributed across cache lines in memory caches. Such a distribution reduces performance degradation attributable to hotspotting memory caches in conventional address mapping.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a conceptual diagram illustrating hash evaluation criteria applied by the hash selector of FIG. 1, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
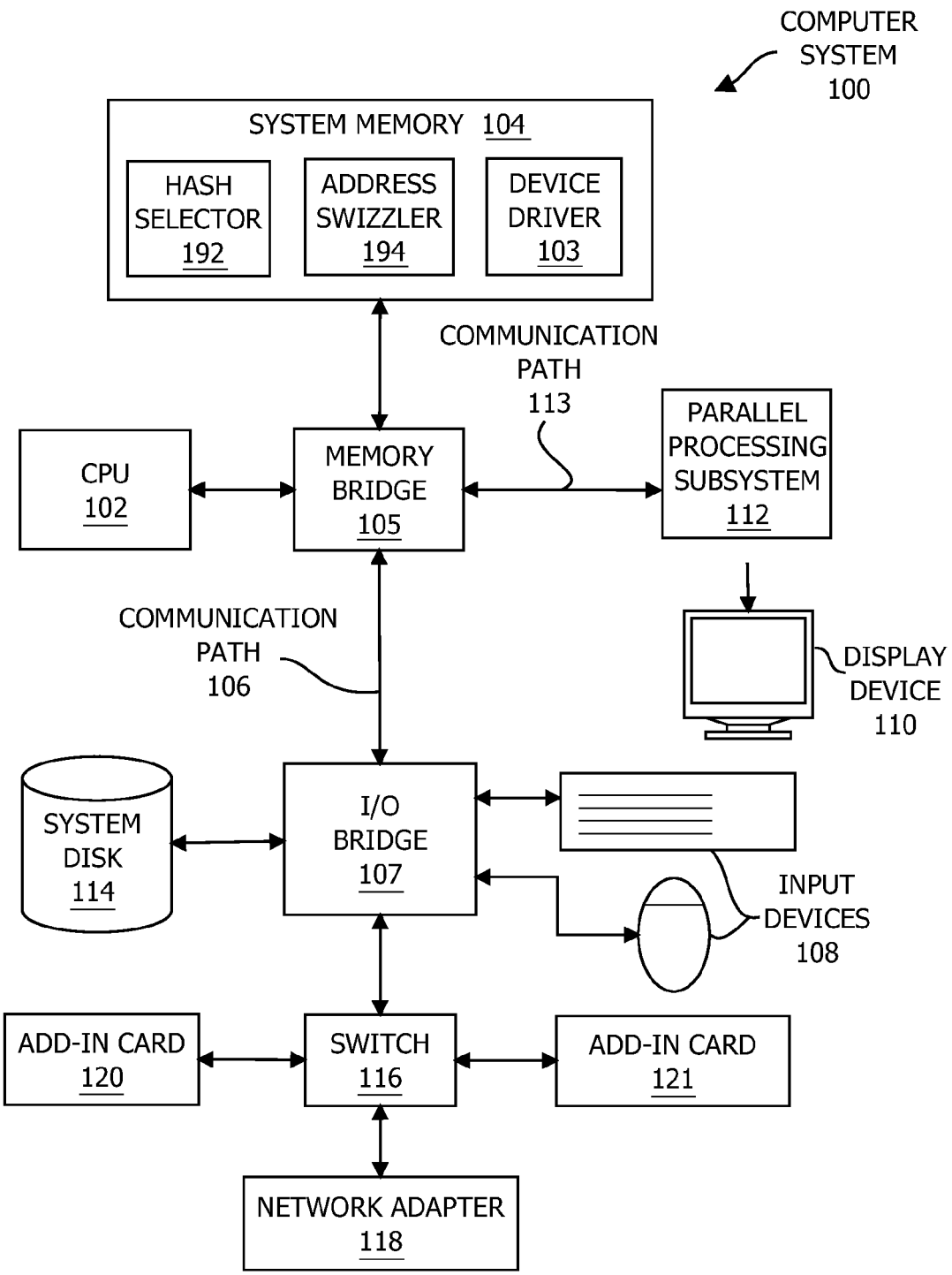
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Address Swizzling

In addition to the system memory 104, the computer system 100 includes various other memories. For instance, each PPU within the parallel processing subsystem 112 is coupled to a local parallel processing (PP) memory. Further, frequently accessed blocks of data are typically stored in one or more relatively small, high speeds memories (caches) as cache lines. The PPUs, PP memories, and caches may be implemented using one or more integrated circuit devices, such as programmable processors, application specific integrated circuits (ASICs), or memory devices, or in any other technically feasible fashion.

In operation, to optimally manage resources (e.g., PP memories, memory bridge 105, PPUs, etc.) and reduce performance bottle-necks, the computer system 100 implements techniques designed to distribute data efficiently between and within memories. Notably, the computer system 100 implements a hashing scheme that maps common input memory address patterns to corresponding swizzled (i.e. permuted and/or combined) addresses that access caches in a relatively uniform manner across the cache lines. Accordingly, as shown, the system memory 104 includes a hash selector 192 and an address swizzler 194 that execute sequentially on the CPU 102 or the parallel processing subsystem 112. The hash selector 192 configures the address swizzler 194 to map input addresses to swizzled addresses (not shown in FIG. 1) that access physical cache locations in desired patterns with respect to particular input address patterns.

In alternate embodiments, the hash selector 192 and the address swizzler 194 may be implemented in software or hardware in any technically feasible fashion. For instance, in some embodiments, the hash selector 192 may be implemented in the system memory 102 and execute on the CPU 102, while the address swizzler 194 may be implemented in programmable hardware units included in the parallel processing subsystem 112. In other embodiments, the hash selector 192 may be implemented in programmable hardware units and the address swizzler 194 may be implemented in fixed hardware that is associated with a particular cache unit, such as the L2 cache. In various embodiments, different hash selectors 192 and address swizzlers 194 may be included in different parts of the computer system 100 and implemented in assorted manners (i.e., any combination of software, programmable hardware, fixed hardware, etc.).

The techniques described herein are illustrative rather than restrictive, and may be altered without departing from the broader spirit and scope of the invention. In general, any software or hardware unit in which multiple inputs are mapped to fewer outputs may incorporate the disclosed techniques to optimize a variety of criteria. For instance, in alternate embodiments, the swizzling techniques may be applied to efficiently distribute data on a crossbar, distribute GPUs screen mapped between memory units, and map DRAM banks inside a DRAM. Further, the address swizzler 194, which is only one type of swizzling unit, may be replaced by any other type of swizzling unit that applies a transformation matrix designed to efficiently distribute data on a crossbar, distribute GPUs screen mapped between memory units, map DRAM banks inside a DRAM, or any similar operation. In general, the address swizzler 194 may be replaced by any other type of swizzling unit.

Figure 2:
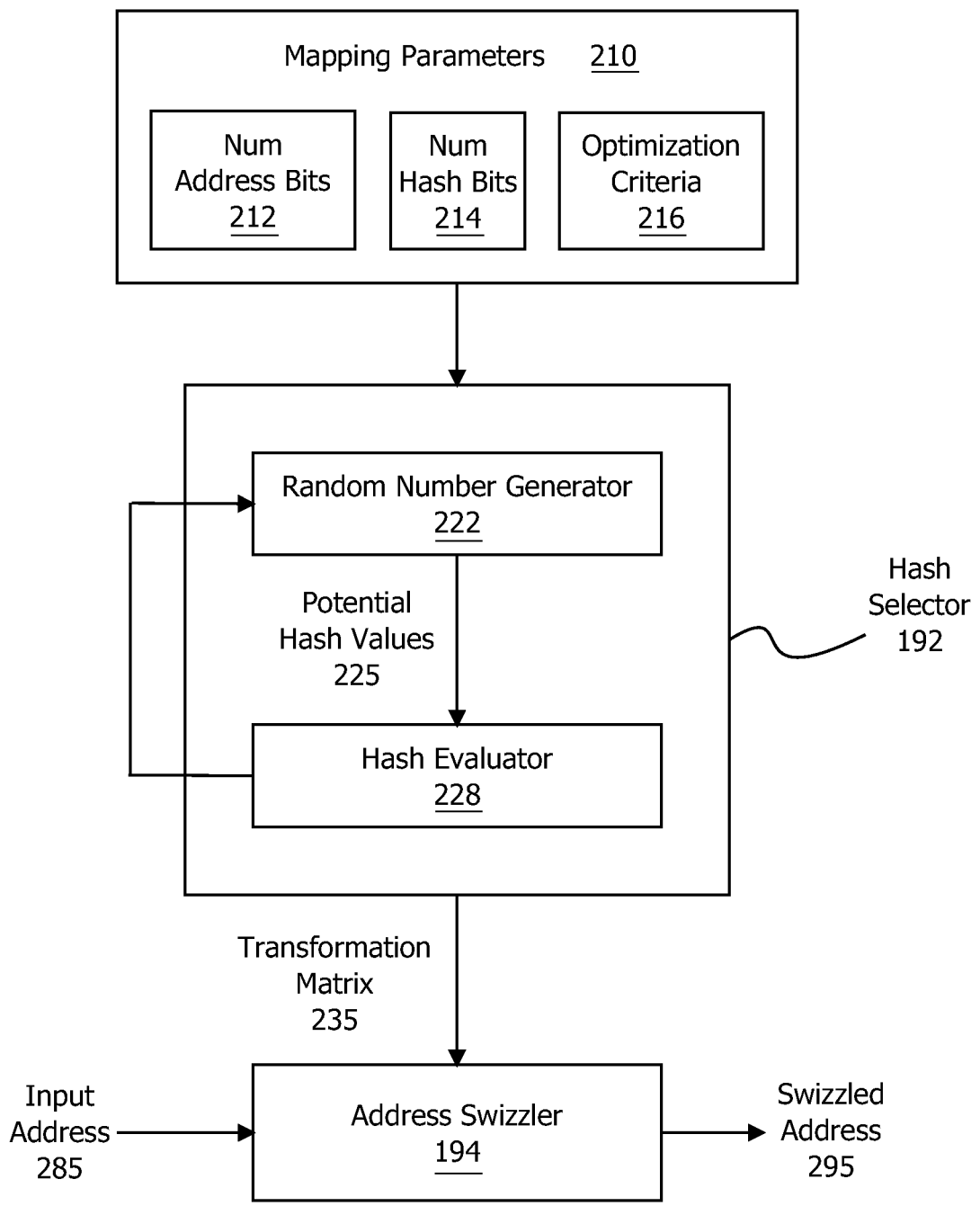
FIG. 2 is a conceptual diagram illustrating the hash selector and the address swizzler of FIG. 1, according to one embodiment of the present invention.

FIG. 2 is a conceptual diagram illustrating the hash selector 192 and the address swizzler 194 of FIG. 1, according to one embodiment of the present invention. As shown, the hash selector 192 receives mapping parameters 210 and generates a transformation matrix 235. Subsequently, the address swizzler 194 applies the transformation matrix 215 to input addresses 285 and generates swizzled addresses 295.

In general, the computer system 100 may include any number of hash selectors 192 and any number of address swizzlers 194. Further, the number of hash selectors 192 and the number of address swizzlers 195 may differ. Together, the hash selectors 192 and the address swizzlers 194 apply a variety of mapping schemes to different memories included in the computer system 100. The hash selector 192 typically executes a single time during the initialization of the computer system 100—generating the transformation matrix 235. By contrast, the address swizzler 194 executes multiple times—translating input addresses 285 to swizzled addresses 295 based on the transformation matrix 235 as software applications execute within the computer system 100. The mapping parameters 210 enable the hash selector 192 to tailor each transformation matrix 235 to reflect a different mapping scheme and/or a different target memory.

As shown, the mapping parameters 210 include, without limitation, a number of address bits (num address bits) 212, a number of hash bits (num hash bits) 214, and optimization criteria 216. The number of address bits 212 specifies the number of bits included in each of the input addresses 285. The number of hash bits 214 specify the number of bits in each swizzled address 295 that identify the cache line (i.e., hash set). By contrast, the remaining bits in each swizzled addresses 295 identify a comparison tag and the offset within the cache line. As is well known in the art, the number of hash bits 214 is the number of bits included in each "hash value" represented in the transformation matrix 235, and the number of comparison tag and offset bits equals the difference between the number of address bits 212 and the number of hash bits 214.

The optimization criteria 216 includes at least one characteristic of the mapping that relates to the rank of the transformation matrix 235. The rank of the transformation matrix 235 correlates to the size of the maximum set of linearly independent columns included in the transformation matrix 235. In particular, if the rank of the transformation matrix 235 equals the number of columns included in the transformation matrix 235, then the transformation matrix 235 is known as "nom-singular." Notably, the rank of the transformation matrix 235 is indicative of the distribution of the swizzled addresses 295 across the cache lines relative to the input addresses 285. If the transformation matrix 235 is non-singular, then applying the transformation matrix 235 to a set of input addresses 285 that represent a power of two stride produces a set of swizzled addresses 295 that are uniformly distributed across the cache lines. As the rank of the transformation matrix 235 decreases, applying the transformation matrix 235 to such a set of input addresses 285 produces swizzled addresses 295 that are less uniformly distributed across the cache lines.

Advantageously, optimizing the transformation matrix 235 to reduce cache hotspotting for input patterns of powers of two often also reduces the likelihood of cache hotspotting for input patterns of non-powers of two. To further reduce hotspotting of caches for input addresses 285 that represent non-power of two strides, the hash selector 192 incorporates randomness into the generation of the transformation matrix 235. In some embodiments, this randomness may be tempered based on one or more additional optimization criteria 216. For instance, in some embodiments, the optimization criteria 216 includes a maximum number of bits in each hash value that equal binary one. Such embodiments may reflect optimizations in the computer system 100 that are designed to reduce the hardware necessary to implement the address swizzler 194.

In various embodiments, any technically feasible optimization criteria 216 may be selected. For instance, to reduce the time required to generate a non-singular N-by-N transformation matrix 235 yet still reduce hotspotting compared to conventional techniques, the optimization criteria 216 may specify a minimum rank of (N−1) for the transformation matrix 235. The optimization criteria 216 may be specified in any manner (graphics interface, specific file formats, etc.). In some embodiments 216, the optimization criteria 216 may be implemented in programmable or fixed hardware.

As shown, the hash selector 192 includes, without limitation, a random number generator 222 and a hash evaluator 228. In operation, the hash selector 192 initializes the transformation matrix 235 to an identity matrix. Any non-singular matrix may be used, but an identity matrix is used for simplicity. Subsequently, the hash selector 192 incrementally modifies the transformation matrix 235 until the transformation matrix 235 reflects a mapping scheme that complies with the optimization criteria 216. More specifically, the hash selector 129 sequentially selects an optimized value for each of the individual hash values included in the transformation matrix 235. For instance, suppose that the number of address bits 212 were to be eight and the number of hash bit values 214 were to be five. In such a scenario, the hash selector 129 would sequentially select three optimized five-bit hash values.

To select each optimized hash value, the random number generator 222 and the hash evaluator 228 collaborate in an iterative manner. For each optimized hash value "h(i)," the random number generator 222 sets a potential hash value 225 to a random number. The hash evaluator 228 then performs deterministic operations that compute the rank of the transformation matrix 235 were the transformation matrix 235 to include the potential hash value 225 as the optimized hash value h(i). If the hash evaluator 228 determines that the rank would not satisfy the optimization criteria 216, then the hash evaluator 228 discards the potential hash value 225. The random number generator 222 then sets the potential hash value 225 to a new random number, and the hash evaluator 228 computes the rank of based on this new potential hash value 225. The random number generator 222 and the hash evaluator 228 continue in this manner until the hash evaluator 228 identifies a potential hash value 225 that enables the corresponding transformation matrix 235 to satisfy the optimization criteria 216.

After determining that setting the optimized hash value h(i) to the potential hash value 225 is acceptable, the hash selector 192 modifies the transformation matrix 235 to reflect this selection of h(i). For instance, if the hash value h(i) were to be represented by a column four in the transformation matrix 235, then the hash selector 129 would update column four to reflect the potential hash value 225. The hash selector 192 repeats this iterative selection process sequentially for any remaining unselected optimized hash values (e.g., h(i+1), h(i+2), etc.). In this fashion, the hash selector 129 generates the final transformation matrix 235 one hash value at a time.

Advantageously, by selecting optimized hash values sequentially based on deterministic operations, the hash selector 192 incrementally adjusts the transformation matrix 235 to reflect the mapping parameters 210. By contrast, in conventional approaches to generating transformation matrices, the hash values are randomly generated as a set, and the set of hash values are either discarded or accepted based on non-deterministic experimentation. As persons skilled in the art will recognize, gradually forming the transformation matrix 235 in this correct-by-construction fashion is substantially less time-consuming and more reliable than such conventional approaches.

After the hash selector 192 generates the transformation matrix 235, the hash selector 192 transmits the transformation matrix 235 to the address swizzler 194. Subsequently, the address swizzler 194 applies the transformation matrix 235 to the input addresses 285 to generate the swizzled addresses 295. As is well known in the art, applying the transformation matrix 235 to the input addresses 285 may involve a variety of different conventions and techniques. For instance, the transformation matrix 235 may be designed to swizzle the upper bits of each input address 285. Alternatively the transformation matrix 235 may be designed to swizzle the lower bits of each input address 285. Further, the transformation operations performed between the input address 285 and the transformation matrix 235 to form each bit in the swizzled address 295 may vary. For instance, different implementations of the transformation operations may include addition operations, Exclusive OR operations, and/or multiplication operations. Embodiments of the current invention may implement any technically feasible technique to combine the input address 285 and the transformation matrix 235 to form the swizzled address 295.

The hashing techniques described herein are illustrative rather than restrictive, and may be modified to reflect various implementations without departing from the broader spirit and scope of the invention. For instance, one or more of the hash selection algorithms described herein may be modified and applied to enable a software application to optimize distribution of items across hash sets. In general, embodiments of the current invention include any hash selection that evaluates the suitability of hash values for inclusion in a transformation matrix based on the rank of the transformation matrix. Further, the random number generator may be implemented in any technically feasible fashion. In some embodiments, the random number generator is replaced with a different type of number generator, such as a pseudo-random number generator that discards certain "forbidden" numbers.

Figure 3:
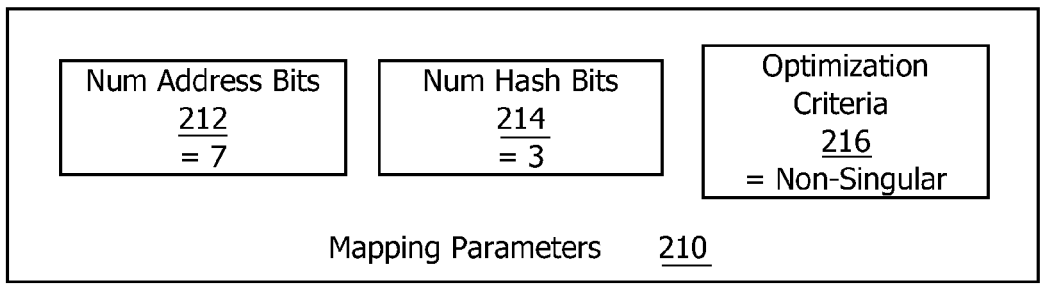
FIG. 3 is a conceptual diagram illustrating swizzled address calculations performed by the address swizzler of FIG. 1, according to one embodiment of the present invention.
Figure 3:
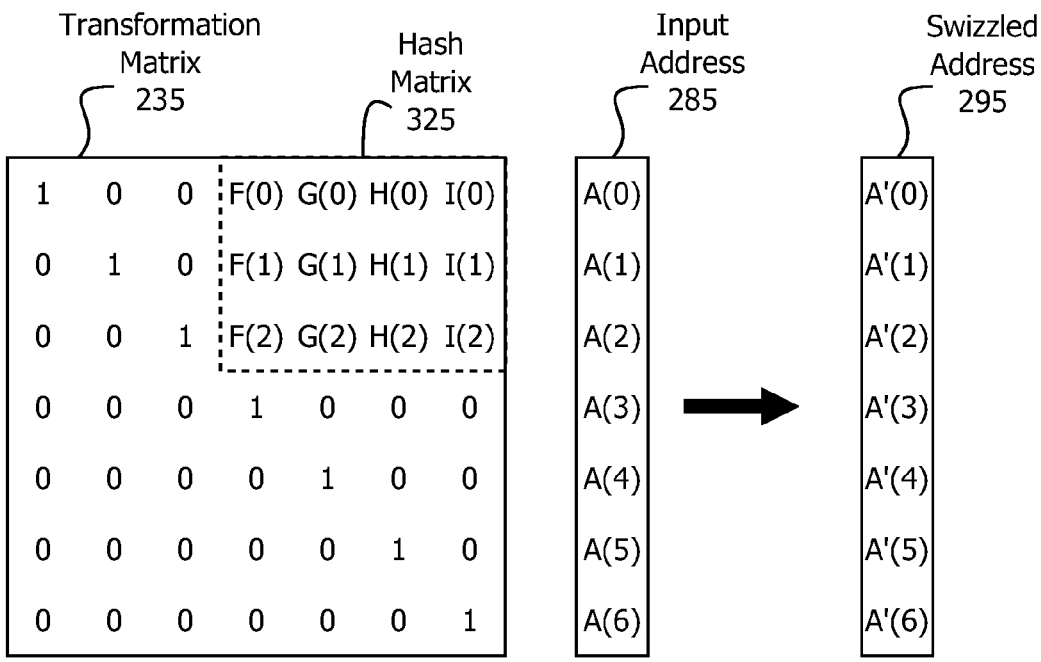

FIG. 3 is a conceptual diagram illustrating swizzled address calculations 370 performed by the address swizzler 194 of FIG. 1, according to one embodiment of the present invention. As outlined in conjunction with FIG. 2, the hash selector 192 generates the transformation matrix 235 based on the mapping parameters 210. Subsequently, the address swizzler 194 applies the transformation matrix 235 to the input address 285—performing the swizzled address calculations 370 to generate the corresponding swizzled address 295.

As shown the mapping parameters 210 specify the number of address bits 212 as seven, the number of hash bits 214 as three, and the optimization criteria 216 as "non-singular." Based on the mapping parameters 210, the hash selector 192 selects four optimized three-bit hash values—F(0:2), G(0:2), H(0:2), and I(0:2)—as the values of a three-by four hash matrix 325 included in the non-singular seven-by-seven transformation matrix.235 Notably, the remaining values included in the transformation matrix 235 correspond to the entries of a seven-by-seven identity matrix.

The input address 285 includes seven bits A(0) through A(6), and the swizzled address 295 includes seven bits A'(0) through A'(6). As depicted in the swizzled address calculations 370, the address swizzler 194 performs bit-wise AND operations and bit-wise Exclusive OR operations between various bits in the input address 285 and the hash values F, G, H, and I to form the swizzled address 295. Notably, each of the bits A'(0) through A'(2) in the swizzled address 295 reflect combinations of the hash values with the input address 285. By contrast, each of the bits A'(3) through A'(6) in the swizzled address 295 equal the respective bits A(3) through A(6) in the input address 285.

Although not shown, bits A'(0) through A'(2) in the swizzled address 295 identify the particular cache line, while the bits A'(3) through A'(6) in the swizzled address 295 identify the tag associated with the particular cache line. Consequently, the hash values F, G, H, and I influence the pattern with which the input addresses 285 access the cache lines. Advantageously, because the transformation matrix 235 is non-singular, if a set of the input addresses 285 corresponds to an input stride that is a power of two, then the corresponding cache accesses are evenly distributed across the cache lines.

FIG. 4 is a conceptual diagram illustrating hash evaluation criteria 470 applied by the hash selector 192 of FIG. 1, according to one embodiment of the present invention. As outlined in conjunction with FIG. 3, the optimization criteria 216 is "non-singular." Consequently, the hash selector 192 selects optimized hash values F, G, H, and I that ensure the transformation matrix 235 is non-singular. The hash selector 192 follows the iterative process outlined in FIG. 2—generating and evaluating potential hash values 225 for each of F, G, H, and I sequentially.

Advantageously, the hash selector 192 leverages the general properties of matrices in conjunction with the incremental modification process to streamline evaluation of each of the potential hash values 225. As the hash selector 192 selects each optimized hash value, the transformation matrix 235 remains non-singular. And as persons skilled in the art will understand, the change in rank attributable to modifying the transformation matrix 235 to include a single hash value may be computed based on a transform submatrix 410 that includes the single hash value. Consequently, to evaluate the suitability of each potential hash value 225, the hash selector 192 determines whether a specific transform submatrix 410 is non-singular.

First, the hash selector 192 initializes the transformation matrix 235 to a seven-by-seven identity matrix. In alternate embodiments, the hash selector 192 may initialize the transformation matrix 235 to any other non-singular matrix. The hash selector 192 then evaluates the potential hash values 225 for F. Referring back to the transformation matrix 235 in FIG. 3, the value of F only impacts entries in column four and rows zero through two. Referring back now to FIG. 4, the transform submatrix 410(0) includes these entries as the right-hand column. Accordingly, the hash selector 192 evaluates the transform submatrix 410(0) to determine the suitability of the potential hash values 225 for F. If the transform submatrix 410(0) is non-singular, then modifying the transformation matrix 235 to reflect the potential hash value 225 for F does not alter the non-singularity of the transformation matrix 235.

Similarly, as noted in the hash evaluation criteria 470, the hash selector 192 streamlines the evaluation process for each of the other hash values G, H, and I. In particular, the hash selector 192 tests the singularity of the transform submatrix 410(1) to determine the suitability of setting G to each potential hash value 225. After setting G to a suitable potential hash value 225, the hash selector 192 tests the singularity of the transform submatrix 410(2) to determine the suitability of setting H to each potential hash value 225. Finally, the hash selector 192 tests the singularity of the transform submatrix 410(3) to determine the acceptability of setting I to each potential hash value 225.

Figure 5A:
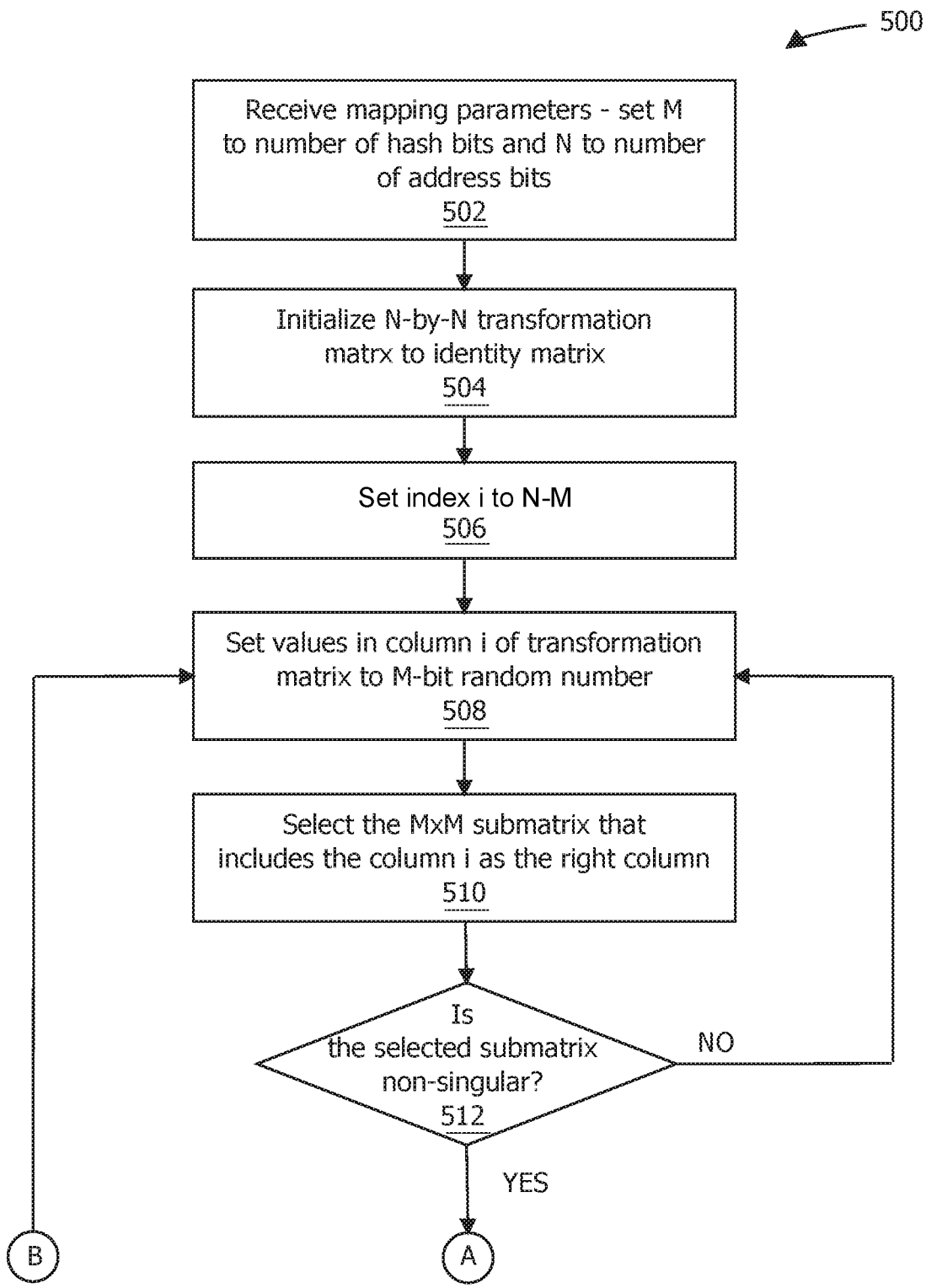
FIGS. 5A-5B set forth a flow diagram of method steps for uniformly distributing memory accesses across a memory cache, according to one embodiment of the present invention.
Figure 5B:
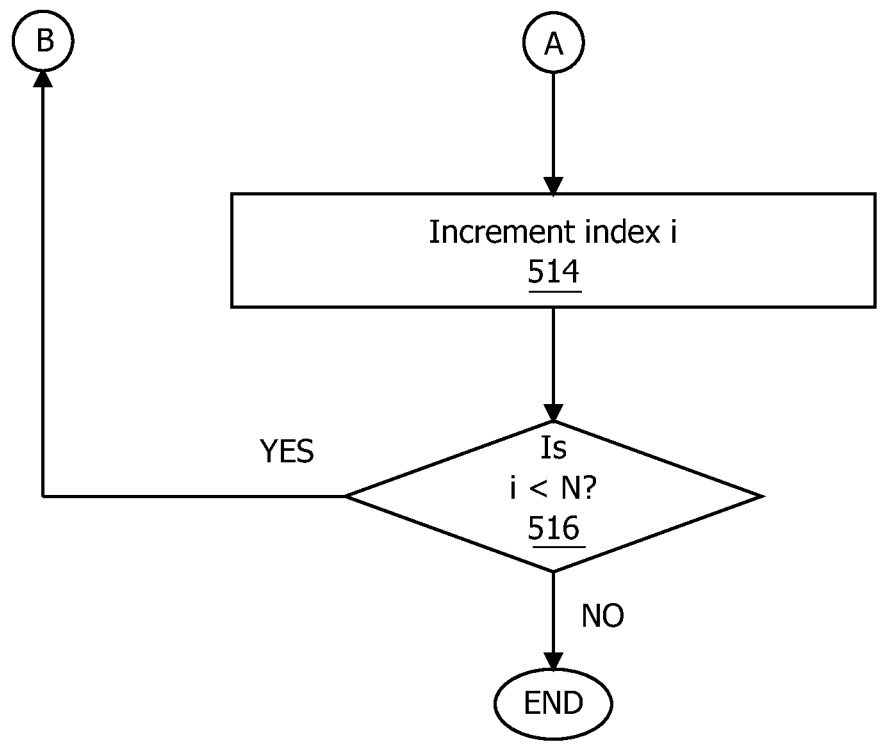

FIGS. 5A-5B set forth a flow diagram of method steps for uniformly distributing memory access across a memory cache, according to one embodiment of the present invention. Although the method steps are described herein in conjunction with the systems of FIGS. 1-4, persons skilled in the art will understand that any system configured to implement the method steps, in any order, falls within the scope of the present invention.

For explanatory purposes only, the context of FIGS. 5A-5B is that the optimization criteria 216 is "non-singular." This optimization criteria 216 configures the hash selector 192 to generate a non-singular transformation matrix 235. Subsequently, when applied by the address swizzler 194, the transformation matrix 235 uniformly distributes memory accesses across cache lines for power of two memory access patterns.

As shown, a method 500 begins at step 502, where the hash selector 192 receives and processes the mapping parameters 210. As disclosed previously herein, the mapping parameters 210 include, without limitation, the number of address bits 212 and the number of hash bits 214. As part of step 502, the hash selector 192 sets a value N to the number of address bits 212 and a value M to the number of hash bits 214. At step 504, the hash selector 192 initializes the N-by-N transformation matrix 235 to the identity matrix.

At step 506, the hash selector 192 sets an index i to the value N−M. At step 508, the random number generator 222 produces the M-bit potential hash value 225. Subsequently, the hash evaluator 228 sets the first M entries included in the i.sup.th column to reflect the potential hash value 225. At step 510, the hash evaluator 228 selects the M-by-M transform submatrix 410 that includes the i.sup.th column as the right-most column. At step 512, if the hash evaluator 228 determines that the selected submatrix 410 is singular, then the hash evaluator 228 concludes that the potential hash value 225 does not satisfy the optimization criteria 216 of non-singular. The method 500 then returns to step 508. The hash selector 192 cycles through steps 508-512, re-generating and re-evaluating potential hash values 225 for the i.sup.th column of the transformation matrix 235 until the hash evaluator 228 determines that the selected submatrix 410 is non-singular.

If, at step 512, the hash evaluator 228 determines that the selected submatrix 410 is non-singular, then the hash evaluator 228 concludes that the potential hash value 225 satisfies the optimization criteria 216 of non-singular. The method 500 then proceeds to step 514. At step 514, the hash selector 192 increments the index i. If, at step 516, the hash selector 192 determines that the index i is less than the number of address bits 212, then the method 500 returns to step 508. The hash selector 192 cycles through steps 508-516, re-generating and re-evaluating potential hash values 225 for each of the remaining columns of the transformation matrix 235. At step 516, if the hash selector 192 determines that the index i is not less than N, then the hash selector 192 concludes that the transformation matrix 235 is both non-singular and reflects (N−M) optimized hash values. The method 500 then terminates.

In sum, a hash selector implements deterministic hash evaluation criteria to construct a transformation matrix that hashes memory addresses evenly across all cache lines for powers of 2 memory address strides. More specifically, to generate a set of M-bit hash values for a N bit address, the hash selector ensures that each M-by-M submatrix included in the N-by-N transformation matrix is non-singular (i.e., has the rank of M). In operation, the hash selector generates an initial N-by-N identity matrix and then modifies (N−M) of the columns sequentially to reflect individual hash values. For each individual hash value, the hash selector randomly generates a potential hash value, modifies the transformation matrix, and evaluates the quality of the transformation matrix thus-far.

As part of the evaluation, the hash selector determines whether the M-by-M submatrix that includes the potential hash value as the right-most column is non-singular. If the hash selector determines that the submatrix is non-singular, then the hash selector chooses the potential hash value as an optimized hash value. By contrast, if the hash selector determines that the submatrix is singular, then the hash selector re-generates the potential hash value, re-modifies the transformation matrix, and re-executes the evaluation process. The hash selector continues this iterative process until the transformation matrix reflects (N−M) optimized hash values.

Advantageously, performing deterministic evaluation operations to incrementally select individual hash values enables efficient generation of a memory address transformation matrix that avoids hostpotting caches during common memory access patterns. In particular, if a software application were to access the cache in a power of 2 memory address stride, then the memory accesses would be uniformly distributed across the cache. Further, since the hash selector randomly generates the potential hash values, the likelihood of hotspotting the cache for non-powers of 2 memory address strides is decreased compared to non-random techniques. By contrast, conventional methods of generating transformation matrices are more time consuming and do not necessarily produce transformation matrices that result in the desired access uniformity across cache lines. Consequently, the disclosed techniques reduce the likelihood of overall system performance degradation attributable to hotspotting While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for performing hashing operations in connection with one or more memory addressing operations, the method comprising:
   generating a first potential hash value;
   assigning a first set of entries included in a transformation matrix to the first potential hash value;
   computing a first rank of a first sub-matrix included in the transformation matrix, wherein the first sub-matrix includes the first set of entries included in the transformation matrix;
   based on the first rank, determining that the first potential hash value does not satisfy a first optimization criterion;
   generating a second potential hash value;
   re-assigning the first set of entries included in the transformation matrix to the second potential hash value;
   re-computing the first rank of the first sub-matrix included in the transformation matrix, wherein the first sub-matrix further includes the reassigned first set of entries included in the transformation matrix;
   based on the first rank, determining that the second potential hash value satisfies the first optimization criterion; and
   performing one or more hashing operations in connection with at least one memory addressing operation based on the transformation matrix to map a first multi-bit value to a second multi-bit value.

2. The method of claim 1, wherein determining that the first potential hash value does not satisfy the first optimization criterion comprises determining that the first rank is less than a minimum rank.

3. The method of claim 2, wherein at least one of the number of rows and the number of columns included in the first sub-matrix is equal to the minimum rank.

4. The method of claim 1, further comprising determining that the second potential hash value satisfies the first optimization criterion.

5. The method of claim 1, further comprising:
   generating a third potential hash value;
   assigning a second set of entries included in the transformation matrix to the third potential hash value;
   computing a second rank of a second sub-matrix included in the transformation matrix, wherein the second sub-matrix includes the first and second set of entries included in the transformation matrix;
   based on the second rank, determining that the third potential hash value does not satisfy the first optimization criteria;
   generating a fourth potential hash value; and
   re-assigning the second set of entries included in the transformation matrix to the fourth potential hash value.

6. The method of claim 1, wherein generating the first potential hash value comprises randomly generating the first potential hash value.

7. The method of claim 1, further comprising:
   generating a third potential hash value;
   determining that the third potential hash value does not satisfy a second optimization criterion; and
   discarding the third potential hash value without determining the rank of any sub-matrix that includes the third potential hash value.

8. The method of claim 1, wherein the first multi-bit value comprises an input memory address, and the second multi-bit value comprises a swizzled memory address.

9. The method of claim 8, further comprising identifying a cache line included in a memory cache and an offset within the cache line based on the swizzled memory address.

10. A non-transitory computer-readable storage medium including instructions that, when executed by a processing unit, cause the processing unit to map multi-bit values in connection with one or more memory addressing operations, by performing the steps of:
    generating a first potential hash value;
    assigning a first set of entries included in a transformation matrix to the first potential hash value;
    computing a first rank of a first sub-matrix included in the transformation matrix, wherein the first sub-matrix includes the first set of entries included in the transformation matrix;
    based on the first rank, determining that the first potential hash value does not satisfy a first optimization criterion;
    generating a second potential hash value;
    re-assigning the first set of entries included in the transformation matrix to the second potential hash value; and
    re-computing the first rank of the first sub-matrix included in the transformation matrix, wherein the first sub-matrix further includes the reassigned first set of entries included in the transformation matrix;
    based on the first rank, determining that the second potential hash value satisfies the first optimization criterion; and
    performing one or more hashing operations in connection with at least one memory addressing operation based on the transformation matrix to map a first multi-bit value to a second multi-bit value.

11. The non-transitory computer-readable storage medium of claim 10, wherein determining that the first potential hash value does not satisfy the first optimization criterion comprises determining that the first rank is less than a minimum rank.

12. The non-transitory computer-readable storage medium of claim 11, wherein at least one of the number of rows and the number of columns included in the first sub-matrix is equal to the minimum rank.

13. The non-transitory computer-readable storage medium of claim 10, further comprising determining that the second potential hash value satisfies the first optimization criterion.

14. The non-transitory computer-readable storage medium of claim 10, further comprising:
generating a third potential hash value;
assigning a second set of entries included in the transformation matrix to the third potential hash value;
computing a second rank of a second sub-matrix included in the transformation matrix, wherein the second sub-matrix includes the first and second set of entries included in the transformation matrix;
based on the second rank, determining that the third potential hash value does not satisfy the first optimization criteria;
generating a fourth potential hash value; and
re-assigning the second set of entries included in the transformation matrix to the fourth potential hash value.

15. The non-transitory computer-readable storage medium of claim 10, wherein generating the first potential hash value comprises randomly generating the first potential hash value.

16. The non-transitory computer-readable storage medium of claim 10, further comprising:
generating a third potential hash value;
determining that the third potential hash value does not satisfy a second optimization criterion; and
discarding the third potential hash value without determining the rank of any sub-matrix that includes the third potential hash value.

17. The non-transitory computer-readable storage medium of claim 10, wherein the first multi-bit value comprises an input memory address, and the second multi-bit value comprises a swizzled memory address.

18. The non-transitory computer-readable storage medium of claim 17, further comprising identifying a cache line included in a memory cache and an offset within the cache line based on the swizzled memory address.

19. A system configured to perform hashing operations in connection with one or more memory addressing operations, the system comprising:

a first memory that includes a first transformation matrix;
a hash selector unit coupled to the first memory and configured to:
generate a first potential hash value;
assign a first set of entries included in the transformation matrix to the first potential hash value;
compute a first rank of a first sub-matrix included in the transformation matrix, wherein the first sub-matrix includes the first set of entries included in the transformation matrix;
based on the first rank, determine that the first potential hash value does not satisfy a first optimization criterion;
generate a second potential hash value; and
re-assign the first set of entries included in the transformation matrix to the second potential hash value; and
re-compute the first rank of the first sub-matrix included in the transformation matrix, wherein the first sub-matrix further includes the reassigned first set of entries included in the transformation matrix;
based on the first rank, determine that the second potential hash value satisfies the first optimization criterion; and
an address swizzling unit coupled to the first memory and configured to:
perform one or more hashing operations in connection with at least one memory addressing operation based on the transformation matrix to map a first multi-bit value to a second multi-bit value.

20. The system of claim 19, wherein determining that the first potential hash value does not satisfy the first optimization criterion comprises determining that the first rank is less than a minimum rank.

21. A system configured to perform swizzling operations based on a transformation matrix in connection with one or more memory addressing operations, the system comprising:
a first memory that includes the transformation matrix, wherein the transformation matrix includes a first sub-matrix, the rank of the first sub-matrix is at least a minimum rank, and the minimum rank corresponds to swizzling operations that generate outputs that exhibit a desired uniformity across a plurality of resources;
a plurality of resources that are coupled to the first memory; and
a swizzling unit that applies the transformation matrix to the plurality of resources in connection with at least one memory addressing operation.

* * * * *